United States Patent [19]

Wieland

[11] 4,173,178

[45] Nov. 6, 1979

[54] PROCESS FOR INTRODUCING A GAS, IN PARTICULAR CARBON DIOXIDE, INTO A LIQUID, PARTICULARLY A BEVERAGE, FLOWING THROUGH A LINE, AND A DEVICE FOR PERFORMING THE PROCESS

[76] Inventor: Dieter Wieland, Oststr. 1, D-4000 Düsseldorf, Fed. Rep. of Germany

[21] Appl. No.: 835,255

[22] Filed: Sep. 21, 1977

[30] Foreign Application Priority Data

Oct. 1, 1976 [DE] Fed. Rep. of Germany ....... 2644378

[51] Int. Cl.$^2$ ............................................. B01F 3/04
[52] U.S. Cl. ................................ 99/323.1; 137/599.1; 261/DIG. 75; 261/64 R; 261/76
[58] Field of Search .................... 99/323.1, 323.2, 277, 99/276, 278, 277.2, 275, 323.3, 467; 137/599.1, 93; 261/DIG. 75, 64 R, 76, DIG. 7; 366/340

[56] References Cited

U.S. PATENT DOCUMENTS

| 1,637,697 | 8/1927 | Jacobsen | 366/340 |
| 2,970,821 | 2/1961 | Axt | 261/76 |
| 3,689,237 | 9/1972 | Stark | 137/599.1 |

*Primary Examiner*—Robert W. Jenkins
*Attorney, Agent, or Firm*—Sprung, Felfe, Horn, Lynch & Kramer

[57] ABSTRACT

An improvement in a process for introducing carbon dioxide into a liquid flowing through a main line, the improvement residing in withdrawing a portion of said liquid through a by-pass line, introducing carbon dioxide into said liquid while in said by-pass line and returning the carbon dioxide enriched liquid to said main line while adjusting the amount of carbon dioxide introduced into said by-pass line to provide a desired carbon dioxide concentration in said liquid in said main line and a device therefore. The process and device disclosed are especially useful for introducing a gas into a beverage, for example, beer, mineral water, barley water, fruit juices, milk and generally alcoholic and nonalcoholic carbon dioxide containing beverages.

8 Claims, 3 Drawing Figures

PROCESS FOR INTRODUCING A GAS, IN PARTICULAR CARBON DIOXIDE, INTO A LIQUID, PARTICULARLY A BEVERAGE, FLOWING THROUGH A LINE, AND A DEVICE FOR PERFORMING THE PROCESS

BACKGROUND OF THE INVENTION

1. Field of the Invention

This invention relates to a process and apparatus for the controlled introduction of carbon dioxide into a liquid, especially a beverage. More particularly, this invention relates to the adjustment of the carbon dioxide concentration in a liquid by a process through which the carbon dioxide concentration can be continuously regulated at low levels of carbon dioxide concentration.

2. Discussion Of The Prior Art

It is known to introduce carbon dioxide gas into a liquid flowing through a line by injecting the gas through an injecting device directly into the liquid flowing through a main conveying pipe, or line.

The injecting device can, for example, be a filter candle made of a ceramic material or a sintered metal. Or the injecting device can be a jet-producing system, essentially a nozzle-system, for example of the kind described in the German Offenlegungsschrift No. 1,517,502.

But introducing the gaseous $CO_2$ directly into the liquid flowing through a main line has the disadvantage that it is difficult to control with precision the resulting concentration of $CO_2$ in the liquid, particularly if a low concentration is intended. The difficulty is particularly severe if the liquid already contains some $CO_2$ and the injection of further $CO_2$ is intended for establishing a precise final concentration in the liquid.

It is an object of this invention to provide a process whereby one can establish and maintain a very desired but precise carbon dioxide concentration in a liquid. It is a further object of this invention to provide such a process which can be accomplished in a convenient, inexpensive manner which does not entail an extensive and complicated device therefore.

SUMMARY OF THE INVENTION

Broadly this invention contemplates an improvement in a process for introducing carbon dioxide into a liquid flowing through a main line, the improvement comprising withdrawing a portion of said liquid through a by-pass line, introducing carbon dioxide into said liquid while in said by-pass line and returning the carbon dioxide enriched liquid to said main line while adjusting the amount of carbon dioxide introduced into said by-pass line to provide the desired carbon dioxide concentration in said liquid in said main line.

The process of the present invention is especially useful for adjusting the carbon dioxide concentration of the liquid in the main line to levels between 0 and 4.5 volume percent, especially between 7.5 and 3 volume percent. It has been found that a particularly good absorption of $CO_2$ is obtained according to the invention by causing the fluid to pass through a line containing numerous bends, said line being positioned downstream of the point where the carbon dioxide is introduced into the by-pass line but upstream of the point where the by-pass line rejoins the main line. So causing the liquid to pass through a pipe of numerous bends the fluid is caused to flow over a tortuous path thereby ensuring intimate admixture of the carbon dioxide with the liquid.

Beverages have not hitherto been carbonated while flowing through a by-pass line, because it was feared that where the by-pass stream rejoins the main stream the dissolved $CO_2$ in the by-pass stream would separate out again, resulting not only in uneven $CO_2$ content in the product liquid but, particularly in the case of beer, excessive foam formation, making measurement of $CO_2$ concentration practically impossible.

It has now surprisingly been found that injection into a by-pass, by the method of the invention, does in fact give excellent results, particularly in the case where the liquid in the main line already contains a fluctuating concentration of $CO_2$, which it is desired to adjust so that the product liquid contains, precisely and constantly, a certain desired concentration.

In the process of the invention between 1/20 and ½ of the main stream is by-passed.

The invention also includes a device for performing the process, the device comprising a main line which conveys the main stream of liquid, and a by-pass line which, branching from the main line, contains a device which serves for introducing carbon dioxide into the liquid, the device being connectable to a source of $CO_2$. Downstream of the device the by-pass line re-joins the main line at a second branching point which is downstream, on the main line, of the first branching point. With advantage the by-pass line can have, downstream of the device which serves for introducing carbon dioxide into the liquid, a portion which has numerous bends.

In another embodiment of this invention there is provided a device for carrying out the process, the device comprising a main line which conveys a main stream of liquid and a by-pass line which branches from the main line and serves to remove a portion of the liquid from the main stream and to reintroduce it after a by-pass line travel into said main line. The by-pass line comprises a device for introducing carbon dioxide into the liquid, the device being connectable to a source of carbon dioxide. Downstream of the device the by-pass line rejoins the main line at a second branching point which is downstream, on the main line, of the first branching point. Preferably, the by-pass line has, downstream of the means for introducing carbon dioxide but upstream of the second branching point a series of numerous bends.

Particularly good results have been obtained by arranging matters so that the device which serves for introducing the carbon dioxide into the liquid is a jet-producing system whose driving jet nozzle is connectable to the by-pass line and whose low-pressure chamber is connectable to a source of carbon dioxide. Conveniently a jet-producing system can be used of the kind described in the German Offenlegungsschrift No. 2,435,011, even though this known system was developed in a different connection. In this known jet-producing system the open cross-sectional areas are in the ratios: $f_1 : f_2 : f_M = 1 : (0.2 \text{ to } 0.45) : (1.3 \text{ to } 2.6)$, where $f_1$ is the cross sectional area of the driving jet outlet, $f_2$ refers to the induction channel inlet in the plane of the driving jet nozzle outlet, and $f_M$ is the bore area of the mixing tube; and the length of the cylindrical mixing tube is 24.5 to 30 time its internal diameter.

The length of main line between the location where the by-pass line re-joins the main line, and the downstream instrumentation used for measuring the $CO_2$ concentration in the product liquid, or between the junction and a downstream bottle-filling machine, serves for mixing the by-pass stream with the main stream of liquid, and for effecting final solution of the $CO_2$. In order to keep this portion of the main line as short as possible, it has been found advantageous to arrange that the main line, just downstream of the junction where it is re-joined by the by-pass line, has an expanded portion which gives the liquid an increased contact area with the wall of the line, per unit length of main line. The expanded portion of the main line can, for example, provide an annular channel for the liquid. It has been found that a particularly rapid absorption of $CO_2$ occurs in the boundary layer of liquid at the increased contact area.

If desired, instead of the expanded portion the main line can contain, just downstream of the junction where it is re-joined by the by-pass line, a venturi nozzle, or several venturi nozzles arranged in a series, the one behind the other.

Preferably there is connected to the main line downstream of the junction where it is re-joined by the by-pass line, a device for continuously measuring the $CO_2$ content of the liquid, the device being connected to a controller for controlling the feed of $CO_2$ to the jet-producing system. The measuring device can, with great advantage, be of of the kind described in German Offenlegungsschrift 26, 34 971.3 of the present applicant the disclosure of which is hereby incorporated herein by reference. This makes it possible to measure the $CO_2$ concentration in the product liquid with great precision, so that the $CO_2$ introduced can be regulated sensitively. And it should be observed that for effective control the distance between the junction point where the by-pass line re-joins the main line, and the point of measurement, must be as short as possible. The arrangements for obtaining this have been described above.

Using a jet-producing system for introducing $CO_2$ into a by-pass line, up to 12 g/l of $CO_2$ can be injected into the by-pass stream, or even more. Thus assuming that a beer flows through the main line containing 4 g/l of $CO_2$, this can easily be adjusted to between 5 and 6 g/l in the product liquid, and this desired concentration can be controlled far more precisely than if the $CO_2$ is injected directly into the main line, because an injection error in the by-pass line is reduced, when the two streams of liquid are mixed together, by a factor equal to the by-pass ratio.

A further advantage of injecting into a by-pass line is a saving in power requirement. The power consumed in injection is also reduced by a factor substantially equal to the by-pass ratio, due to the fact that the pumps which propel the liquid stream into which $CO_2$ is injected are smaller by that ratio.

The invention can also be applied, with great advantage, in rapidly and accurately correcting erroneous $CO_2$ concentration in mineral waters, lemonades and other beverages which contain great amounts of $CO_2$. The accuracy of the correction is increased, for the reasons already mentioned, compared with methods in which the $CO_2$ is injected directly into the main stream of liquid, with improved economy in the utilization of $CO_2$.

Injecting $CO_2$ into a by-pass line, by the method of the invention, has a still further advantage due to the fact that if the $CO_2$ were to be injected directly into the main stream of liquid, using a jet-producing system for the purpose, this would have to be equipped with two pressure controllers, the one upstream and the other downstream of the jet-producing system, so that pressure fluctuations in the main line neither reduce linear flow velocity in the jet-producing system to below the critical value, nor produce such a great pressure drop across it that evolution of gaseous $CO_2$ results. In the device according to the invention the two pressure controllers are unnecessary because, unless pressure fluctuations in the main line become excessive, the linear velocity of flow in the by-pass can be held essentially constant.

BRIEF DESCRIPTION OF DRAWINGS

Referring to the drawings herein.

DESCRIPTION OF SPECIFIC EMBODIMENTS

Figure 1:
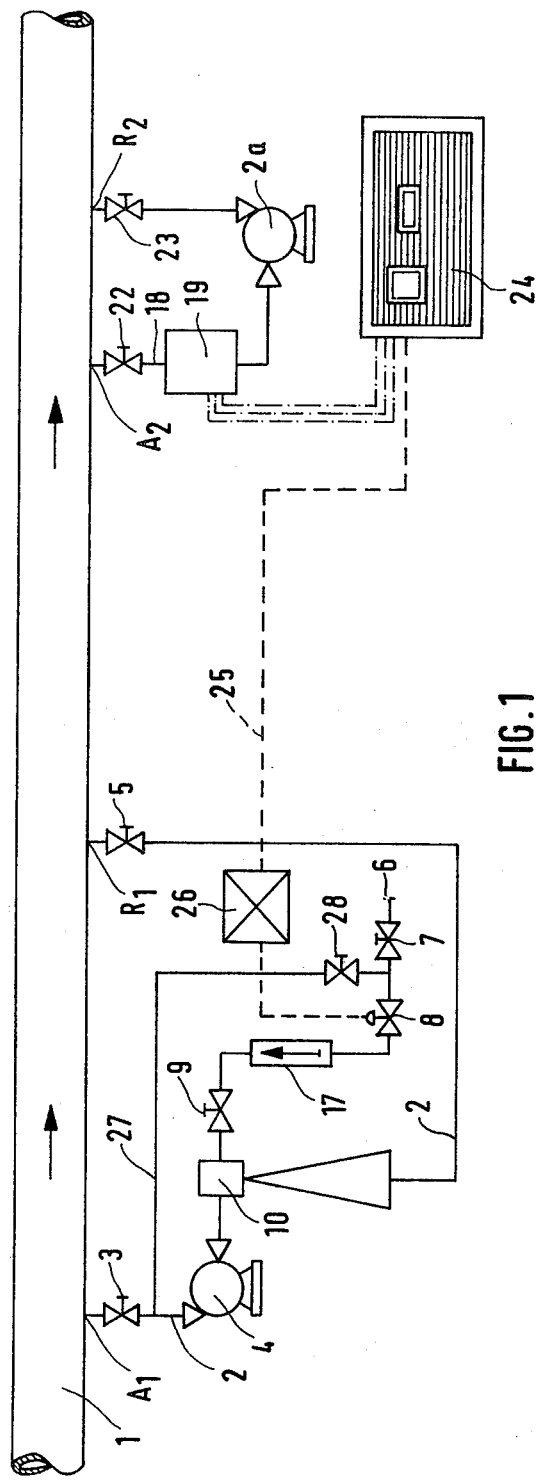
FIG. 1 shows diagrammatically a device for introducing carbon dioxide into a liquid.
Figure 3:
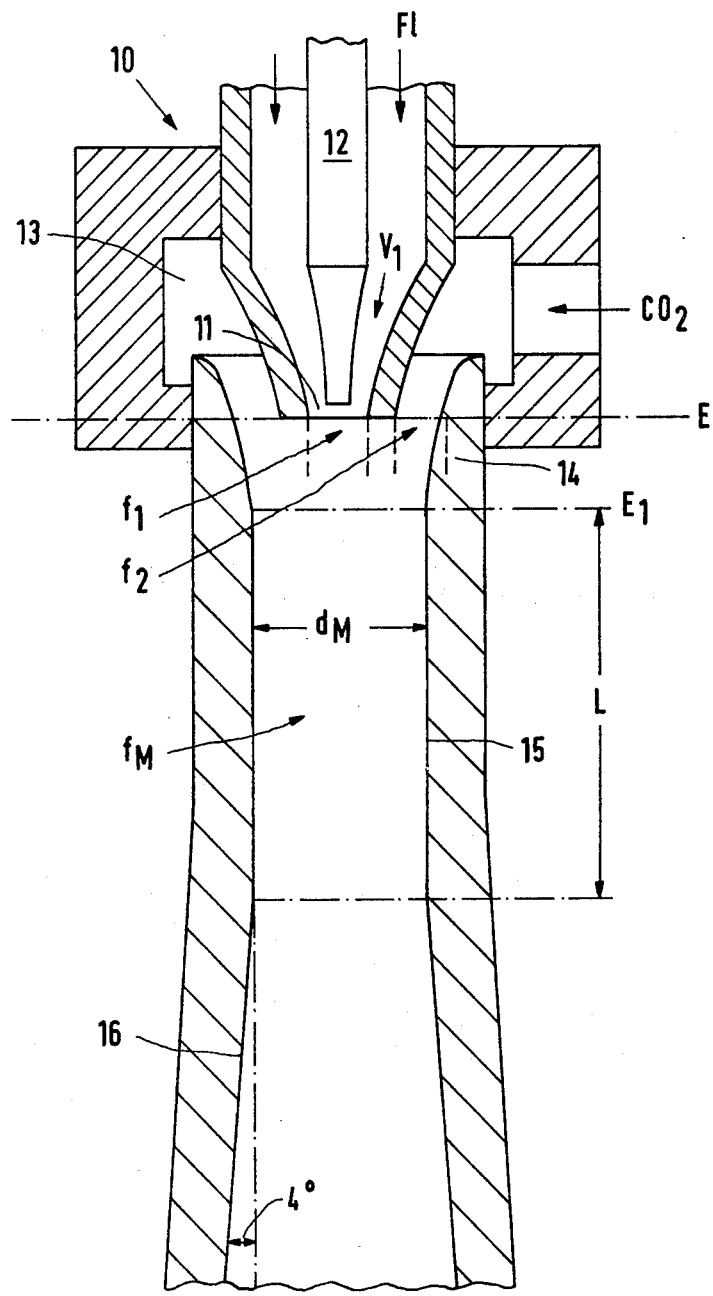
FIG. 3 is a vertical section through a jet-producing system for use in the device of FIG. 1.

In the device shown in FIG. 1 the liquid into which $CO_2$ is to be introduced, for example beer, flows through a main line 1. Connected at a junction point $A_1$ to the main line 1 over a valve 3 there is a by-pass line 2, whose other end is connected over a further valve 5 to the main line 1 at a downstream junction point $R_1$, a stream of liquid being driven through the by-pass line by a centrifugal pump 4, which drives the liquid through a jet-producing system 10. Connected to a low-pressure chamber of the jet-producing system 10 is a valve 9, followed by a flowmeter 17, a control valve 8 and a pressure-reducing valve 7 which is connected to a source 6 of carbon dioxide, which is not shown in the drawing. The carbon dioxide is introduced, in the jet-producing system 10, which is described in greater detail further below, into the liquid which is being pumped by the centrifugal pump 4 through the by-pass line 2. The jet-producing system 10 is shown very diagrammatically, and drawn to a larger scale, in FIG. 3, for the purpose of illustrating the relationships between the different flow cross sections.

The jet-producing system 10 comprises a driving jet nozzle 11 containing a needle 12. Liquid is propelled through the outlet cross section $f_1$ of the nozzle 11 at a linear speed of 15 to 20 m/s. The nozzle 11 is situated in a low-pressure chamber 13, to which carbon dioxide is fed, and surrounding the nozzle 11 is an induction channel 14, followed downstream by a mixing tube 15 and a diffusor 16 which expands at an angle of 8°.

The outlet cross section $f_1$ of the nozzle 11 is in the transverse plane E. The cross section of the annular induction channel 14 in this plane is indicated at $f_2$. The length L of the mixing tube 15, measured from the outlet $E_1$ of the induction channel 14, is 24.5 to 30 times its diameter $d_M$. Its cross section is indicated at $f_M$. The ratios $f_1:f_2:f_M$ are 1:(0.2 to 2.45):(1.3 to 2.6).

The jet-producing system 10 functions as follows: Assuming that a stream of liquid F1 is flowing out of the nozzle 11, and that $CO_2$ is entering the low-pressure chamber 13, a stream of $CO_2$ is aspirated through the annular cross section $f_2$ of the induction channel 14 into the mixing tube 15, where it mixes intimately with the stream of liquid issuing from the nozzle 11. Subsequently the $CO_2$ becomes largely dissolved in the liquid during passage through the by-pass line 2. To promote solution, the by-pass line 2 follows a serpentine course in the region of the junction point $R_1$, as represented at 2a in FIG. 2. That is to say, between the jet-producing system 10 and its outlet end 2b, where the by-pass line 2 re-joins the main line 1, the by-pass line has a series of bends 2a which give the line a serpentine course or, if preferred, a helical formation can be used.

Figure 2:
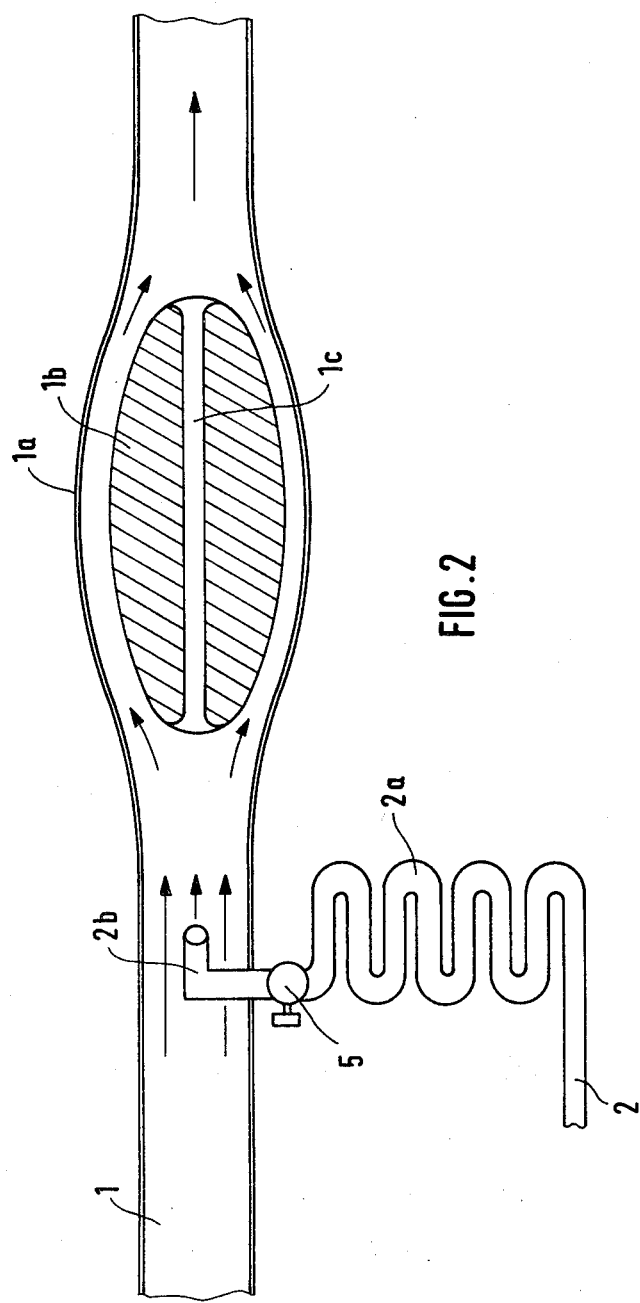
FIG. 2 shows a detail similar to FIG. 1 drawn to a larger scale.

From FIG. 2 it will be seen that in the main line 1, just downstream of the junction point $R_1$ of the by-pass line 2, the main line expands in its diameter to enclose a body 1b. The dimensions here are such that there results an annular passage, around the body 1b, with an open cross section about the same as that of the main line 1. This causes the liquid to flow over an enlarged contact surface, so that a large fraction of the liquid is delayed in the boundary layer. It has been found that this artifice greatly increases the quantity of $CO_2$ taken up by the liquid. To improve the flow conditions, the body 1b has a central longitudinal bore 1c.

Downstream of the junction $R_1$ of the by-pass line 2 with the main line 1 there is a measuring device for measuring the $CO_2$ content of the liquid. This is also shown in FIG. 1. From a junction point $A_2$ a by-pass line 18 containing a valve 22, followed by a measurement cell 19, a centrifugal pump 20 and a valve 23 re-joins the main line 11 at a further junction point $R_2$. The $CO_2$ content of the liquid is measured continuously in the liquid being pumped through the cell 19 by the pump 20. The measurement cell 19 can, if desired, be constructed as described in said German Offenlegungsschrift No. 26,34,971.3. The measured values are delivered to a display device 24, which contains a conventional signal transducer and an electronic computer. The results are indicated and/or recorded and can be used for process control and/or data processing. Furthermore, the results are applied over an instrument line 25 to a controller 26 for controlling, by means of the valve 8, the flow of $CO_2$ to the jet-producing system 10. Thus, whenever the $CO_2$ in the liquid in the main line 1 deviates from the desired value, the controller 26 adjusts the flow of $CO_2$ to the jet-producing system 10 until the desired $CO_2$ concentration in the liquid is re-established.

For cleaning the system a flushing line is provided, as indicated at 27, containing a valve 28. This line connects the source of $CO_2$ to the upstream end of the by-pass line 2, allowing the entire device to be cleaned and disinfected or sterilized by passing through the by-pass line 2 a cleaning or disinfecting agent of the kind conventionally used in bottle-filling machines in breweries and soft-drink factories.

What I claim is:

1. A device for introducing carbon dioxide into a liquid which comprises a main line through which a liquid can pass, a bypass line branching from said main line at a first point and returning to said main line at a second point, means for introducing carbon dioxide into said liquid maintained in said by-pass line, said means comprising a jet producing system which in turn comprises a driving jet nozzle connected to said bypass line, said bypass line having a low pressure chamber in fluid communication with a source of carbon dioxide, the cross sectional areas in said jet producing system being in the ratios: $f_1:f_2:f_M = 1:(0.2 \text{ to } 0.45):(1.3 \text{ to } 2.6)$, where $f_1$ is the cross sectional area of the outlet of said driving jet nozzle, $f_2$ refers to the induction channel inlet in the plane of said driving jet nozzle outlet and $f_M$ is the bore area of a mixing tube which mixing tube is in fluid communication with the outlet of said driving jet nozzle said mixing tube being cylindrical and having a length equal to 24.5 to 30 times the internal diameter $d_M$ of said mixing tube.

2. A device according to claim 1 wherein downstream of the point where said means for introducing said carbon dioxide introduces carbon dioxide into said by-pass line and upstream of the point where said by-pass line re-joins said main line said by-pass line has a portion comprising a plurality of bends.

3. A device according to claim 1 wherein downstream of the point where the by-pass line re-joins the main line the main line has at least one venturi nozzle.

4. A device according to claim 3 wherein downstream of the point where said by-pass line joins said main line said main line has a plurality of venturi nozzles disposed in series with respect to one another.

5. A device according to claim 1 wherein downstream of the point where said by-pass line re-joins said main line there is a means for determining the carbon dioxide content of the liquid in said main stream, said carbon dioxide determining means being connected to a controller which controls the amount of carbon dioxide introduced into said liquid while in said by-passing line.

6. A device according to claim 1 wherein said main line, downstream of the junction where said bypass line rejoins said main line, has an expanded portion with an annular channel for passage of the liquid.

7. A device according to claim 6 wherein in the direction of flow said expanded portion has a generally elliptical cross section and within the ellipse there is a flow splitting member disposed in such a manner that it produces a passage channel with annular cross section for the fluid.

8. A device according to claim 1 wherein said main line is in fluid communication with a source of beer.

* * * * *

UNITED STATES PATENT AND TRADEMARK OFFICE
CERTIFICATE OF CORRECTION

PATENT NO. : 4,173,178
DATED : November 6, 1979
INVENTOR(S) : DIETER WIELAND

It is certified that error appears in the above-identified patent and that said Letters Patent are hereby corrected as shown below:

Column 1, line 59, "7.5" should read -- 1.5 --.

Signed and Sealed this

Eighth Day of April 1980

[SEAL]

Attest:

SIDNEY A. DIAMOND

*Attesting Officer*  *Commissioner of Patents and Trademarks*